Patented Oct. 8, 1940

2,216,812

UNITED STATES PATENT OFFICE 2,216,812

MOISTUREPROOF SHEET MATERIAL AND MOISTUREPROOFING COMPOSITION

Robert Barnett Flint, Wilmington, Del., assignor to E. I. du Pont de Nemours & Company, Wilmington, Del., a corporation of Delaware No Drawing. Application April 30, 1938, Serial No. 205,250

23 Claims. (Cl. 91—68)

This invention relates to moistureproofing compositions and to means for producing them. It relates more particularly to moistureproof sheet materials having improved surface characteristics.

With the modern trends of development in the packaging of commodities, especially perishable foodstuffs, the need has arisen for a wrapping material which can at once provide physical protection against contamination, preservative action by retaining within the package the original conditions such as moisture content, and sales appeal by permitting examination of the package contents without destroying the wrapper. These needs have been largely fulfilled by the recent introduction to the trade of a wrapping material comprising a transparent base sheet, such as regenerated cellulose, coated with a transparent moistureproofing composition, which latter may in one form thereof comprise a cellulose derivative and a wax with or without a resin or blending agent and preferably also a plasticizer.

Prior to the introduction of the transparent moistureproof wrapping materials above mentioned, the wrapping materials were generally of the character of waxed papers and could be at least superficially joined by means of heat and pressure. The wrapping industry is generally provided with expensive equipment designed for heat sealing and will look with favor on new materials only if they can be adapted to this equipment. Moistureproof wrapping materials, such as the coated regenerated cellulose described above, also have the property of being heat sealable to a degree, but the joint is not sufficiently rugged to satisfy the current demands.

These moistureproof wrapping materials are furnished to the consumer in the form of continuous roll stock or as cut-to-size sheets. In order that the roll stock will unroll smoothly or the cut-to-size sheets separate easily, the surface of the material must be smooth and non-tacky and there must be no tendency towards caking or sticking together during the time of storage which intervenes between manufacture and consumption. The moistureproofing composition, on the other hand, must be flexible, transparent and sufficiently thermoplastic to permit intermingling of superposed coatings during the brief period of the heat sealing operation with immediate set-up thereafter, although it cannot be so thermoplastic that it will be affected by the temperature variations normally encountered in handling or storage.

One object of this invention comprises the production of improved moistureproof film. A further object of the invention relates to the production of moistureproof wrapping tissues which fulfill the requirements for flexibility and transparency and additionally possess a high degree of surface smoothness, slip and resistance to sticking under storage conditions. Further objects of the invention will appear hereinafter.

This invention is primarily concerned with moistureproofing compositions for the production of films (either as a coating on a selected base, or as a self-sustaining film), comprising cellulose derivatives, a moistureproofing agent, a plasticizer and preferably also a resin or other blending agent. The term "moistureproofing agent" defines the material which serves as the basis for moistureproofness. In the formulation of cellulose derivative coating compositions it is well known in the art to use a plasticizing agent to impart flexibility to the coating. This is also true in the formulation of cellulose derivative coating compositions which contain moistureproofing agents, but it has been observed that the plasticizer also contributes to the moistureproofing property, and for the production of highly moistureproof coating compositions more plasticizer is employed than is necessary merely for its plasticizing action. The use of excess plasticizer to accomplish this purpose, however, tends to impair the surface characteristics of the moistureproofing coating composition since with increased plasticizer content the composition becomes softer, stickier and more thermoplastic. The softness and stickiness are objectionable from the point of view of good surface slip and storage. The increased thermoplasticity would be advantageous for the improvement of heat sealing properties were it not for the fact that the minimum amount of plasticizer which will afford good heat sealing is so close to the amount which will still avoid softness and tackiness that the practical control of such a composition to insure a coated product of uniformly good heat sealing properties and uniformly good surface characteristics is extremely difficult, especially for the commercial production of a continuous coated sheet material. Indeed, many common plasticizers pass the point which is critical for good surface before the point of satisfactory heat seal is reached.

For the purposes of this invention, moistureproof materials are defined as those which, in the form of a thin, continuous and unbroken sheet or film, will permit the passage of not more than 690 grams of water vapor per 100 square meters per hour over a period of 24 hours at approximately 39.5° C.±0.5° C., the relative humidity of the atmosphere at one side of the film being maintained at least at 98% and the relative humidity of the atmosphere at the other side being maintained at such value as to give a humidity differential of at least 95%.

Moistureproofing coating compositions are defined as those which, when laid down in the form of thin, continuous, unbroken films, applied uniformly as a coating with a total coating thickness not exceeding 0.0005" to both sides of a sheet of regenerated cellulose of thickness approximately 0.0009", will produce a coated product which is moistureproof.

For the purpose of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.) with a water vapor differential of 50–55 mm. (preferably 53.4±0.7 mm.) of mercury. For convenience, the number of grams of water vapor passed under these conditions may be referred to as "permeability value". An uncoated sheet of regenerated cellulose having a thickness of approximately 0.0009" will show a permeability value of the order of 6900.

In the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

The composition may be coated on to the base to give a wide range of coating thicknesses and, where heat sealing is desired, increase in the coating thickness will increase the heat sealing property of any given composition. For the purpose of this invention, and particularly where the ultimate coated sheet material is to be used as a wrapping tissue, the coating thickness is 0.00002" to 0.0005" and preferably 0.00005" on each side of the base.

When heat sealing properties are desired, it will be found that sheet materials provided with compositions of Examples 4, 5 and 6 of Table I are truly heat sealable in the sense that a heat sealed joint will be stronger than a joint sealed by means of acetone. Additionally, the joint will be at least as strong as a solvent sealed joint obtained by means of methoxy ethanol. These same considerations apply to films obtained by casting the coating compositions per se.

For the purpose of comparison and definition, the following test has been used to measure the strength of the heat-seal bond. Two strips of the coated material 1½" wide are superimposed one on the other so that opposite faces of the film are in contact. A seal is made across the width of the material at one end by placing the film on a metal plate heated to 130° C. and rolling thereover a roller ⅝" wide weighted to 650 grams.

The two strips so sealed are opened at the free ends and placed in a stretching device, such as a Suter Testing Machine, by gripping each end of the sheet in suitable clamps, one of which is fixed, while the other is moved away at a constant speed of 12" per minute. The force in grams required to pull the sheets apart is taken as a measure of the heat-seal bond strength.

In connection with this invention it has now been found that there are certain plasticizers for cellulose derivatives, especially in cellulose derivative moistureproofing agent coating compositions, which are unique in their ability to plasticize and provide excellent surface and storage characteristics. Though these plasticizers are not moistureproofing agents per se, they tend in cellulose derivative moistureproofing agent coating compositions to increase moistureproofness. The plasticizers which possess these unique properties are the polyaryl derivatives of amides of aliphatic acids containing 6–18 carbon atoms. They may be used alone or in combination with other known plasticizers to produce moistureproofing coatings which exhibit a high degree of moistureproofness; good appearance, flexibility and transparency; excellent surface slip, and storage without sticking or marring.

I have found that cellulose derivative coating compositions plasticized with the amide derivatives of this invention exhibit unique properties which may account for the improved surface and storage characteristics. The composition is thermoplastic and becomes heat sealable at elevated temperatures only. At ordinary temperatures, the coating retains its normal characteristics and exhibits no adhesiveness. Consequently, the coated sheets will possess good surface slip and will not be subject to caking, sticking or marring in storage because the coating suffers no deformation under the stresses encountered in storage. The thermoplasticity of the coating at elevated temperatures, however, affords excellent heat sealing properties. The same considerations are applicable to compositions comprising a moistureproofing agent.

Generally speaking, the coating compositions embodied in this invention comprise a polyaryl derivative of an amide of an aliphatic acid containing 6–18 carbon atoms in combination with a cellulose derivative, a moistureproofing agent and preferably a resin or blending agent. In addition, other plasticizers, drying or non-drying oils, additional resinous material of either the natural or synthetic varieties, coloring agents either as dyes or pigments, or other modifying agents may be used according to the type of coating composition desired. Obviously, for those uses where a transparent coated material is desired, any pigments or modifying agents which will impair the transparency of the coating composition will be omitted therefrom. The proportions of the several ingredients may vary within rather wide limits, depending on the properties desired in the finished composition, and these will be more specifically set forth below and will be illustrated in the several examples.

As previously mentioned, the plasticizers contemplated by this invention are polyaryl derivatives of amides of fatty acids containing 6–18 carbon atoms which are not moistureproofing agents per se. Though various polyaryl derivatives of amides of fatty acids containing 6–18 carbon atoms may be used, I have secured highly satisfactory results using the N-diphenyl derivatives of fatty acids containing 6–18 carbon atoms, and hence prefer this class. As specific examples of the preferred N-diphenyl derivatives of fatty acids containing 6-18 carbon atoms may be mentioned diphenyl lauramide, diphenyl caprylamide, diphenyl myristamide, diphenyl 2-ethyl hexamide, diphenyl 2-ethyl butyramide and diphenyl stearamide.

As additional plasticizers for use in combination with those of this invention may be mentioned any of the known plasticizers, such as dibutyl phthalate, dilauryl phthalate, cyclohexyl butyl phthalate, di-(methylcyclohexyl) phthalate, di-(dimethylcyclohexyl) phthalate, methyl-(dimethyl-cyclohexyl) adipate, dicyclohexyl adipate, tricresyl phosphate, esters of o-benzoyl benzoic acid, such as butyl benzoyl benzoate, derivatives of toluene sulfonamide, or the like.

As moistureproofing agents, waxes or wax-like materials such as paraffin, petrolatum, ceresin, Japan wax, palm wax, beeswax, certain chlorinated hydrocarbons, Chinese insect wax or other synthetic waxes or wax-like material may be used. If some of these waxes are too soft for the purposes desired, they may be mixed with harder waxes of the group or with carnauba wax, candelilla wax or other harder waxes. Generally, paraffin serves as a satisfactory moistureproofing agent which may be hardened if necessary by admixture with carnauba or candelilla wax. In the examples which accompany this specification, paraffin, having a melting point of at least 60° C., has been employed as typical of a highly satisfactory moistureproofing agent, but it is to be understood that other moistureproofing agents may be substituted.

As the cellulose derivative, there can be used cellulose ethers such as glycol, ethyl, or benzyl cellulose; cellulose esters such as cellulose nitrate which is particularly useful, cellulose acetate which is of limited compatibility; and such mixed esters or ether-esters as cellulose acetate-nitrate, cellulose acetate-propionate or ethyl cellulose-nitrate. The cellulose derivatives may be of various degrees of conversion, as, for example, cellulose nitrates of various nitrogen contents.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, soluble resins of the phenol-formaldehyde type. Non-resinous blending agents may be used when they yield homogeneous mixtures, and these may include hydrogenated castor oil, castor oil phthalate, lanolin or wool grease, ethyl abietate, methyl abietate, diethylene glycol rosinate, diethylene glycol hydrorosinate or the like.

As illustrative of moistureproofing coating compositions which embody the principles of this invention, the specific examples of Table I are given, but they should not be considered in any way as limitative of the scope of this invention.

Table I

|  | 1 | 2 | 3 | 4 | 5 | 6 | 7 | 8 | 9 |
|---|---|---|---|---|---|---|---|---|---|
| Diphenyl 2-ethyl butyramide | 32.0 | | | | | | | | |
| Diphenyl 2-ethyl hexamide | | 24.0 | | | | | | | |
| Diphenyl caprylamide | | | 21.0 | | | | | | |
| Diphenyl aluramide | | | | 36.0 | 18.5 | 19.5 | 10.0 | | |
| Diphenyl myristamide | | | | | | | | 21.0 | 21.0 |
| Diphenyl stearamide | | 57.6 | 60.0 | | | | | 60.0 | 60.0 |
| 12.5% nitrogen nitrocellulose | | 57.6 | 60.0 | | | | | | |
| 11.5% nitrogen nitrocellulose | 58.0 | | | 54.0 | 54.0 | | | | |
| 11.0% nitrogen nitrocellulose | | | | | | 52.0 | | | |
| Ethyl cellulose | | | | | | | 62.0 | | |
| Dammar resin, dewaxed | 7.0 | 14.4 | 15.0 | 7.0 | | | | 15.0 | 15.0 |
| Modified rosin* | | | | | | 6.0 | 25.0 | | |
| Beckacite—1110** | | | | | 6.0 | | | | |
| Paraffin wax, M. P. 60° C | 3.0 | 4.0 | 4.0 | 3.0 | 3.0 | 3.0 | 3.0 | 4.0 | 4.0 |
| Dicyclohexyl phthalate | | | | | | 19.5 | | | |
| Dibutyl phthalate | | | | | 18.5 | | | | |
| Ethyl acetate | 477.0 | 455.0 | 455.0 | 477.0 | 477.0 | 477.0 | | 455.0 | 455.0 |
| Toluene | 236.0 | 258.0 | 258.0 | 236.0 | 220.0 | 220.0 | 590.0 | 258.0 | 258.0 |
| Ethyl alcohol | 22.0 | 22.0 | 22.0 | 22.0 | 38.0 | 38.0 | 145.0 | 22.0 | 22.0 |

* See United States Patent No. 2,017,866.
** A resin made and sold by Beck-Koller Company.

When the heat seal test described above is applied to sheets of regenerated cellulose coated with a moisture-proofing coating composition, such as Examples 4, 5 and 6 of Table I, so that the total coating thickness is approximately 0.0001″ (approximately 3 grams of composition solids per square meter for both sides), a heat sealing value of 180 or greater is obtained. These heat sealing values are to be considered as merely illustrative of the bond strength attainable, since it is obvious that greater or lesser bond strengths may have many useful applications, depending on the use to which the coated base material is put.

It is most convenient to apply the above moisture-proofing coating compositions to base materials such as sheets of regenerated cellulose by means of suitable solvents. Thus, the film-forming ingredients, conveniently considered as solids, indicated in any of the above examples may be dissolved to give a coating solution of appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent, moistureproof, coated base will be obtained. A suitable technique for this operation is set forth in Charch and Prindle United States Patent No. 1,737,187.

Table I contains solvent compositions used in connection with the coating compositions of the examples. These solvent mixtures may be modified by the addition of other well-known lacquer solvents to obtain special drying effects without in any way affecting the unique properties of N-aryl amides of aliphatic acids as set forth in this specification.

These moistureproofing compositions may be applied to various sheet materials to produce wrapping tissues which are flexible, moistureproof and heat sealable and which exhibit highly improved surface characteristics including excellent surface slip and resistance to caking, sticking or marring during storage. A variety of base sheet materials may be used, such as cellulosic materials, paper, albuminous materials (gelatin, agar-agar, casein), or films made from rubber derivatives, e. g., rubber hydrochloride, chlorinated rubber, or the material prepared by reacting rubber and a metal halide, such as boron trifluoride, stannous or stannic chloride, stannic acid, and other materials which are disclosed in an article by Thies and Clifford, in the "Journal of Industrial and Engineering Chemistry," Vol. 26, page 123 (1934), the method of reacting the materials conforming to that disclosed in the said article referred to. In the preferred embodiment of the invention, a non-porous, non-fibrous, dense, smooth surfaced and preferably transparent material, such as regenerated cellulose, cellulose ester films including cellulose nitrate and cellulose acetate, or cellulose ether films including ethyl cellulose, benzyl cellulose, glycol cellulose or lowly etherified cellulose, such as those in which there is only one substituent group for several glucose units of cellulose, is employed.

In the coating compositions set forth in the above examples it is apparent that the proportions of the several ingredients may be varied over a considerable range. Thus, the cellulose derivative may comprise 40-65% or more of the total solids although in most instances 50-60% will be found most satisfactory with approximately 55% a convenient and generally useful proportion. The ratio of cellulose derivative to blending agent may vary over a wide range from 2:1 to 8:1, or even greater, but, for most purposes, a ratio from 3:1 to 7:1 is satisfactory, while a ratio of 4:1 is convenient and yields generally good results. The cellulose derivative is usually in excess of the total plasticizer content, and the ratio of cellulose derivative to plasticizer may vary from 1:1 to 3:1, but a ratio of 1.5:1 to 3:1 is generally found to give the best results.

The blending agent may vary according to the cellulose derivative, plasticizer or moistureproofing agent employed, and it may constitute 1-20% or more of the total solids. When highly heat sealable compositions are desired, the amount of blending agent is preferably low and may comprise 5-10% or less of the total solids. The ratio of blending agent to moistureproofing agent may vary from 1:5 or less to 5:1 or more, and usually a ratio of approximately 3:1 or 4:1 will be found satisfactory. The larger amounts of blending agent are usually used when the blending agent exerts some plasticizing action and can therefore replace a portion of the plasticizer.

The moistureproofing agent is usually present in a quantity sufficient to impart a suitable degree of moistureproofness while still maintaining homogeneity of composition so that the ultimate moistureproofing coating on the moistureproof article prepared in accordance with the invention will be clear, transparent, non-greasy, non-smeary, and non-tacky under the normal conditions of handling or storage. Generally speaking, if the moistureproofing agent constitutes less than 10% of the total solids, these conditions will be fulfilled, but while 2-6% of moistureproofing agent has been found to yield excellent results, it is to be understood that more or less may be used depending on the nature of the moistureproofing agent or the degree of moistureproofness desired.

The plasticizer may consist of an N-aryl amide of an aliphatic acid of the type previously described or a mixture of plasticizers containing appreciable quantities of one or more of these specific compounds if the objects of the invention are to be accomplished. The total plasticizer concentration may vary from 15-45% of the total solids. Low percentages of plasticizer, however, are usually used only when the blending agent is capable of exerting a plasticizing action and can therefore substitute for a portion of plasticizer which might otherwise be added. Among the objects of the invention is the production of highly moistureproof and optionally heat sealable coating compositions and for the accomplishment of this object it is usually necessary to use relatively large amounts of plasticizer and, as illustrated in the accompanying examples, the use of 30-40% or more of plasticizer is preferable. When the total plasticizer comprises substances other than N-aryl amides of aliphatic acids hereinbefore described, such for example as dibutyl phthalate or a plasticizing blending agent, it is preferable that the N-aryl amide of aliphatic acids predominate. Usually, 50% or more of the total plasticizer should be provided by these substances, although as little as 25% or even less may be used with certain plasticizers without completely eliminating the unique properties of these specific plasticizers. Because of the desired high percentage of plasticizer in the total composition, the ratio of plasticizer to moistureproofing agent may be quite high, in some instances amounting to as much as 20:1. On the other hand, if a plasticizing blending agent is used, the ratio of plasticizer to moistureproofing agent may fall as low as 6:1. Usually, a ratio of 7:1 to 10:1 will be found to serve satisfactorily.

In the preceding discussion of the proportions of ingredients in the coating compositions, the ranges of percentage composition or ratio have been given to facilitate the formulation of highly satisfactory and preferred compositions and to aid one skilled in the art in quickly and easily arriving at operable compositions not specifically described in the examples. It is to be understood, however, that these limiting ranges are larely illustrative and do not restrict the invention beyond the limitations set forth in the appended claims.

Though the moistureproofing compositions have been described specifically for coating, it is to be understood that they may also be cast in any known manner to produce self-sustaining, flexible, transparent, moistureproof and heat sealable film which exhibits highly improved surface characteristics, including excellent surface slip and resistance to caking, sticking or marring during storage.

Where percentages and proportions are referred to throughout the specification, they represent parts by weight unless indicated otherwise.

Since it is obvious that various changes and modifications may be made in the above description without departing from the nature or spirit thereof, this invention is not restricted thereto except as set forth in the appended claims.

I claim:

1. A film-forming composition comprising a cellulose derivative, and, as a plasticizer, a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

2. A film-forming composition comprising a cellulose derivative, and, as a plasticizer, an N-diphenyl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

3. A film-forming composition comprising a cellulose derivative, a moistureproofing agent, and, as a plasticizer, a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

4. A film-forming composition comprising a cellulose derivative, a moistureproofing agent, and, as a plasticizer, an N-diphenyl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

5. A film-forming composition comprising a cellulose derivative, a moistureproofing agent, a blending agent, and, as a plasticizer, a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

6. A film-forming composition comprising a cellulose derivative, a moistureproofing agent, a blending agent, and, as a plasticizer, an N-diphenyl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

7. A film-forming composition comprising a cellulose derivative, a moistureproofing agent, and, as a plasticizer, diphenyl lauramide, said cellulose derivative being selected from the class which consists of cellulose esters, cellulose ethers and cellulose ether-esters.

8. A film-forming composition comprising a cellulose derivative, a moistureproofing agent, and, as a plasticizer, diphenyl caprylamide, said cellulose derivative being selected from the class which consists of cellulose esters, cellulose ethers and cellulose ether-esters.

9. A film-forming composition comprising a cellulose derivative, a moistureproofing agent, and, as a plasticizer, diphenyl myristamide, said cellulose derivative being selected from the class which consists of cellulose esters, cellulose ethers and cellulose ether-esters.

10. A film-forming composition comprising 40% to 65% of a cellulose derivative, not over 10% of a moistureproofing agent, 1% to 20% of a blending agent, and 15% to 45% of a plasticizer comprising a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters, the proportions being by weight based on the total solids.

11. A film-forming composition comprising a cellulose derivative, a moistureproofing agent, a blending agent and a plasticizer comprising a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters, the ratio of the quantity of cellulose derivative to the quantity of plasticizer being between 1:1 and 3:1.

12. A film-forming composition comprising a cellulose derivative, a moistureproofing agent, a blending agent and a plasticizer comprising a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters, the ratio of the quantity of plasticizer to the quantity of moistureproofing agent being not over 20:1.

13. A composition for producing moistureproof heat sealable films comprising a cellulose derivative, a moistureproofing agent, a blending agent and a plasticizer comprising a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters, the ratio of the quantity of blending agent to the quantity of moistureproofing agent being between 1:5 and 5:1.

14. An article of manufacture comprising a base sheet material coated with a moistureproof composition comprising a cellulose derivative, a moistureproofing agent, and, as a plasticizer, a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

15. An article of manufacture comprising a base sheet material coated with a moistureproof composition comprising a cellulose derivative, a moistureproofing agent, and, as a plasticizer, a diphenyl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

16. An article of manufacture comprising a transparent, non-fibrous base sheet material coated with a transparent, moistureproof composition comprising a cellulose derivative, a moistureproofing agent, and, as a plasticizer, a polyaryl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

17. An article of manufacture comprising a transparent, non-fibrous base sheet material coated with a transparent, moistureproof composition comprising a cellulose derivative, a moistureproofing agent, and, as a plasticizer, an N-diphenyl derivative of an amide of a fatty acid containing 6 to 18 carbon atoms and which is not a moistureproofing agent per se, said cellulose derivative being selected from the class which consists of cellulose esters, cellulose ethers and cellulose ether-esters.

18. An article of manufacture comprising a base sheet coated with a moistureproof composition comprising a cellulose derivative, a moistureproofing agent, and, as a plasticizer, diphenyl lauramide, said cellulose derivative being selected from the class which consists of cellulose esters, cellulose ethers and cellulose ether-esters.

19. An article of manufacture comprising a base sheet coated with a moistureproof composition comprising a cellulose derivative, a moistureproofing agent, and, as a plasticizer, diphenyl caprylamide, said cellulose derivative being selected from the class which consists of cellulose esters, cellulose ethers and cellulose ether-esters.

20. An article of manufacture comprising a base sheet coated with a moistureproof composition comprising a cellulose derivative, a moistureproofing agent, and, as a plasticizer, diphenyl myristamide, said cellulose derivative being selected from the class which consists of cellulose esters, cellulose ethers and cellulose ether-esters.

21. A film-forming composition in which the solids comprise the following ingredients in the following approximate proportions, the proportions being by weight and based on the total solid content:

| | |
|---|---|
| Diphenyl lauramide | 36.0 |
| 11.5% nitrogen nitrocellulose | 54.0 |
| Dammar resin (dewaxed) | 7.0 |
| Paraffin wax (M. P. 60° C.) | 3.0 |

22. A film-forming composition in which the solids comprise the following ingredients in the following approximate proportions, the proportions being by weight and based on the total solid content:

| | |
|---|---|
| Diphenyl caprylamide | 21.0 |
| 12.5% nitrogen nitrocellulose | 60.0 |
| Dammar resin (dewaxed) | 15.0 |
| Paraffin wax (M. P. 60° C.) | 4.0 |

23. A film-forming composition in which the solids comprise the following ingredients in the following approximate proportions, the proportions being by weight and based on the total solid content:

| | |
|---|---|
| Diphenyl myristamide | 21.0 |
| 12.5% nitrogen nitrocellulose | 60.0 |
| Dammar resin (dewaxed) | 15.0 |
| Paraffin wax (M. P. 60° C.) | 4.0 |

ROBERT BARNETT FLINT.